(12) United States Patent
Saitou et al.

(10) Patent No.: US 10,300,598 B2
(45) Date of Patent: May 28, 2019

(54) ROBOT WITH DAISY-CHAINABLE ROBOT ARM

(71) Applicant: FANUC CORPORATION, Yamanashi (JP)

(72) Inventors: Sou Saitou, Yamanashi (JP); Tsutomu Shikagawa, Yamanashi (JP); Kiichi Inaba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/484,634

(22) Filed: Apr. 11, 2017

(65) Prior Publication Data

US 2017/0291298 A1    Oct. 12, 2017

(30) Foreign Application Priority Data

Apr. 12, 2016   (JP) .................................. 2016-079622

(51) Int. Cl.
*B25J 9/12*       (2006.01)
*G05B 19/00*      (2006.01)
*H02P 5/74*       (2006.01)

(52) U.S. Cl.
CPC ................ *B25J 9/12* (2013.01); *G05B 19/00* (2013.01); *H02P 5/74* (2013.01); *Y10S 901/23* (2013.01)

(58) Field of Classification Search
CPC . G05B 2219/34448; G05B 2219/40299; B25J 9/126; B25J 9/08; B25J 18/04; B25J 17/0241; B25J 9/12; Y10S 901/23
See application file for complete search history.

(56) References Cited

U.S. PATENT DOCUMENTS

| 4,455,838 A | * | 6/1984 | Junichi | F01B 21/04 74/665 A |
| 4,517,853 A | * | 5/1985 | Tani | B25J 9/041 74/89.32 |
| 4,843,292 A | * | 6/1989 | Ono | B25J 9/126 318/606 |
| 4,954,952 A | * | 9/1990 | Ubhayakar | B25J 9/0084 901/31 |
| 5,990,638 A | * | 11/1999 | Aoyama | G05B 19/4141 318/562 |
| 6,101,951 A | * | 8/2000 | Sigel | E03F 3/06 104/138.2 |
| 6,147,469 A | * | 11/2000 | Uchida | G05B 19/414 318/16 |

(Continued)

FOREIGN PATENT DOCUMENTS

| JP | 2003136454 A | 5/2003 |
| JP | 2000-262014 | 6/2004 |
| JP | 2005125489 A | 5/2005 |

*Primary Examiner* — Victor L MacArthur
(74) *Attorney, Agent, or Firm* — RatnerPrestia (57) ABSTRACT

A robot includes a motor drive power source for converting a voltage supplied from a power source to a motor drive unit-grade voltage and outputting it, a motor drive unit for converting a motor drive unit-grade voltage output from the motor drive power source to a motor drive voltage and outputting it, a motor driven to be rotated by a motor drive voltage output by the motor drive unit, a robot arm on which the motor drive unit and the motor are arranged, and a robot controller which is provided independently of the robot arm and on which the motor drive power source is arranged.

6 Claims, 7 Drawing Sheets

(56) References Cited

U.S. PATENT DOCUMENTS

| | | | |
|---|---|---|---|
| 7,347,120 B2 | 3/2008 | Friedrich et al. | |
| 9,054,608 B2* | 6/2015 | Sugie | G05B 19/4155 |
| 9,647,513 B2* | 5/2017 | Park | H02K 11/33 |
| 9,895,815 B2* | 2/2018 | Watanabe | B25J 19/0054 |
| 2004/0193318 A1* | 9/2004 | Ito | B25J 9/06 |
| | | | 700/245 |
| 2005/0166413 A1* | 8/2005 | Crampton | B25J 13/088 |
| | | | 33/503 |
| 2014/0111244 A1* | 4/2014 | Langhans | G01R 31/2621 |
| | | | 324/762.09 |
| 2015/0100159 A1* | 4/2015 | Park | H02K 7/14 |
| | | | 700/258 |
| 2016/0057940 A1* | 3/2016 | Lyons | A01G 3/037 |
| | | | 47/1.43 |
| 2016/0271807 A1* | 9/2016 | Kawauchi | B25J 19/0029 |
| 2017/0098959 A1* | 4/2017 | Kikuchi | H01H 47/223 |
| 2017/0098964 A1* | 4/2017 | Sakata | H02J 50/80 |
| 2017/0098965 A1* | 4/2017 | Kikuchi | B25J 19/0045 |
| 2017/0257089 A1* | 9/2017 | Zehetbauer | G01R 31/42 |
| 2018/0079090 A1* | 3/2018 | Koenig | A61B 34/70 |

\* cited by examiner

ROBOT WITH DAISY-CHAINABLE ROBOT ARM

BACKGROUND OF THE INVENTION

1. Field of the Invention

The present invention relates to a robot including a robot arm capable of daisy-chaining.

2. Description of the Related Art

Generally, a robot uses an alternating current voltage as a voltage for driving a motor provided on a robot arm. Therefore, the robot includes a motor drive power source and a motor drive unit as a system for driving a motor. The motor drive power source is a converter that rectifies a three-phase alternating current voltage supplied from the alternating current power source side and outputs a direct current voltage to a DC link (direct current link), and the motor drive unit is an inverter that is connected to the DC link, which is the direct current side of the motor drive power source, converts a direct current voltage on the DC link side to an alternating current voltage through switching operation of an internal switching element, and supplies the alternating current voltage to an alternating current motor. In the following, the "motor drive power source" is a converter and the "motor drive unit" is an inverter. The motor provided on the robot arm is driven so as to be rotated by an alternating current voltage output by the motor drive unit.

Figure 7:
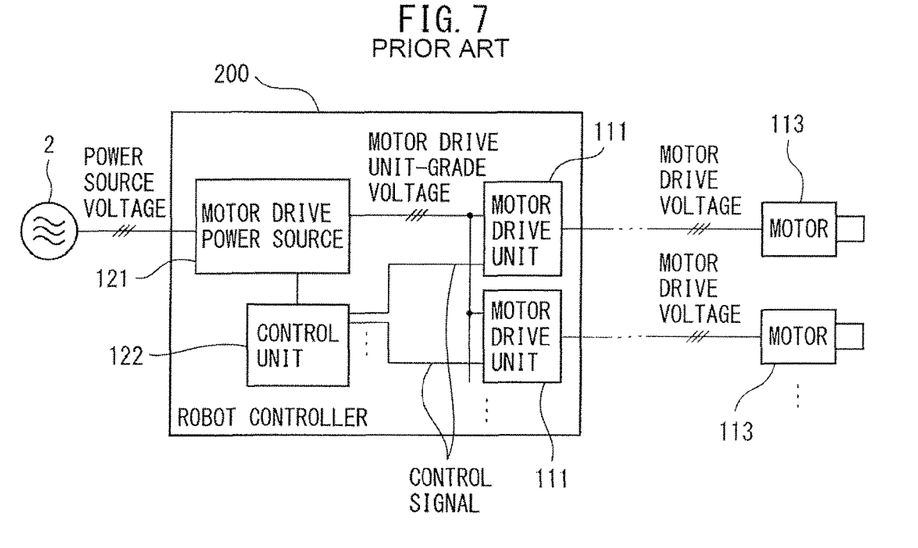
FIG. 7 is a diagram illustrating a general robot controller.
Figure 8:
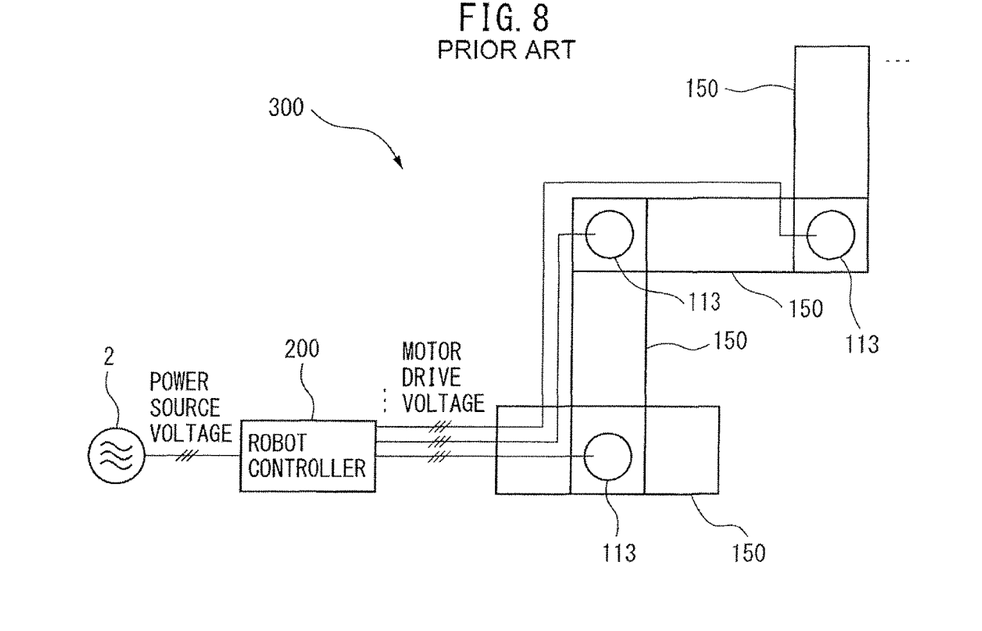
FIG. 8 is a diagram illustrating a general articulated robot.

FIG. 7 is a diagram illustrating a general robot controller. FIG. 8 is a diagram illustrating a general articulated robot. Generally, a motor drive unit (inverter) 111, a motor drive power source (converter) 121, and a control unit 122 are provided in a robot controller 200. The motor drive unit 111 mounted in the robot controller 200 is provided in the same number as the number of motors 113 in order to supply a motor drive voltage to the motors 113 mounted on each of the robot arms 150 of a robot 300. One motor drive power source 121 is provided in the interest of reduction in cost and occupancy space. According to the configuration in which only the motors 113 are provided on each of the robot arms 150, and the motor drive units 111, the motor drive power source 121 and the control unit 122 are provided in the robot controller 200 as illustrated in FIGS. 7 and 8, the weight of the robot arms 150 can be reduced. Therefore, such a configuration has been widely adopted for robots.

However, because, with such a configuration, an increase in number of the robot arms 150 results in an increase in number of the motors 113, the wiring number of power line cables for connecting the motor drive units 111 and the motors 113 to supply an alternating current voltage to the motors 113 is increased. As a result, the total wiring length of the power line cables is so long that twisting or interference of the wiring is a factor that restricts the operation of the robot. In addition, because wiring work requires a lot of effort when the number of wires in power line cables is large, in order to reduce such effort, the number of alternating current motors (and eventually the number of power line cables) is reduced to restrict the operation of the robot, or a wiring route or measures that do not restrict the operation of the robot are taken in some cases.

As described, for example, in Japanese Patent No. 3534641, amplifier-integrated motors in each of which a motor and an amplifier are housed in a single casing are adapted to be connectable via a main bus to reduce the wiring number of cables.

As described above, a conventional robot reduces the cost and the occupancy space as well as the weight of a robot arm in such a way that a motor drive unit (inverter), a motor drive power source (converter) and a control unit are provided in a robot controller and only a motor is provided on the robot arm. However, with such a configuration, an increase in number of robot arms results in an increase in number of motors, the wiring number of power line cables connecting the motor drive units and the motors is increased. As a result, the total wiring length of the power line cables is so long that twisting or interference of the wiring is a factor that restricts the operation of the robot.

In particular, in the case of an articulated robot that has robot arms each of which is provided with an alternating current motor are connected, the wiring number of power line cables is enormous and wiring patterns have significant limitations. When the number of wires in power line cables and signal line cables is large, rearrangement work of a robot is not easy.

In addition, Japanese Patent No. 3534641 describes that an amplifier-integrated motor in which an amplifier (motor drive unit) is integrated with a motor is connected to a battery (motor drive power source) with a direct current power supply line (power line cable). Therefore, because an amplifier-integrated motor is provided in a robot arm when the invention described in Japanese Patent No. 3534641 is applied to an articulated robot, a direct current power supply line for connecting the battery (motor drive power source) and the amplifier-integrated motor needs to be provided. Because an increase in number of robot arms results in an increase in number of amplifier-integrated motors, the wiring number of direct current power supply lines connecting the battery (motor drive power source) and the amplifier-integrated motor is increased. In short, the number of wires in a cable is increased even with the invention described in Japanese Patent No. 3534641, resulting in a redundant system and higher cost.

SUMMARY OF INVENTION

Thus, it is desired to provide a low-cost robot in which the wiring number of power line cables can be reduced and rearrangement work of a robot arm can be easy.

According to one aspect of the present disclosure, a robot includes a motor drive power source for converting a voltage supplied from a power source to a motor drive unit-grade voltage and outputting the motor drive unit-grade voltage, a motor drive unit for converting the motor drive unit-grade voltage output from the motor drive power source to a motor drive voltage and outputting the motor drive voltage, a motor driven to be rotated by a motor drive voltage output by the motor drive unit, a robot arm on which the motor drive unit and the motor are arranged, and a robot controller which is provided independently of the robot arm and on which the motor drive power source is arranged.

Herein, the robot the robot arm may include a connection unit for daisy-chaining an input side of the motor drive unit arranged on the robot arm, the input side being for the motor drive unit-grade voltage, to an input side of the motor drive unit arranged on a robot arm different from the robot arm, the input side being for the motor drive unit-grade voltage, and the motor drive unit-grade voltage output from the motor drive power source is input to the motor drive units arranged on the respective robot arms via the connection unit.

Further, the robot may further include a casing for housing therein the motor drive unit and the motor driven to be rotated by the motor drive unit.

Further, a motor drive unit control unit for controlling conversion operation of the motor drive unit may be arranged on the robot arm on which the motor drive unit is arranged.

Further, the connection unit may include two connectors each including a power terminal for electrical connection to a power line cable for supplying the motor drive unit-grade voltage, and a star-connected local power line cable each one end thereof is electrically connected to any of the two connectors and the input side of the motor drive unit, the input side being for the motor drive unit-grade voltage.

BRIEF DESCRIPTION OF THE DRAWINGS

The present invention will be more clearly understood with reference to the following accompanying drawings.

DETAILED DESCRIPTION

Next, embodiments of the present disclosure are described with reference to the drawings. In the following drawings, like members are designated with like reference numerals. For the sake of easy understanding, the scales of the drawings are properly changed. In addition, forms illustrated in the drawings are examples for carrying out the present disclosure, and the present disclosure is not limited to the illustrated forms.

Figure 1:
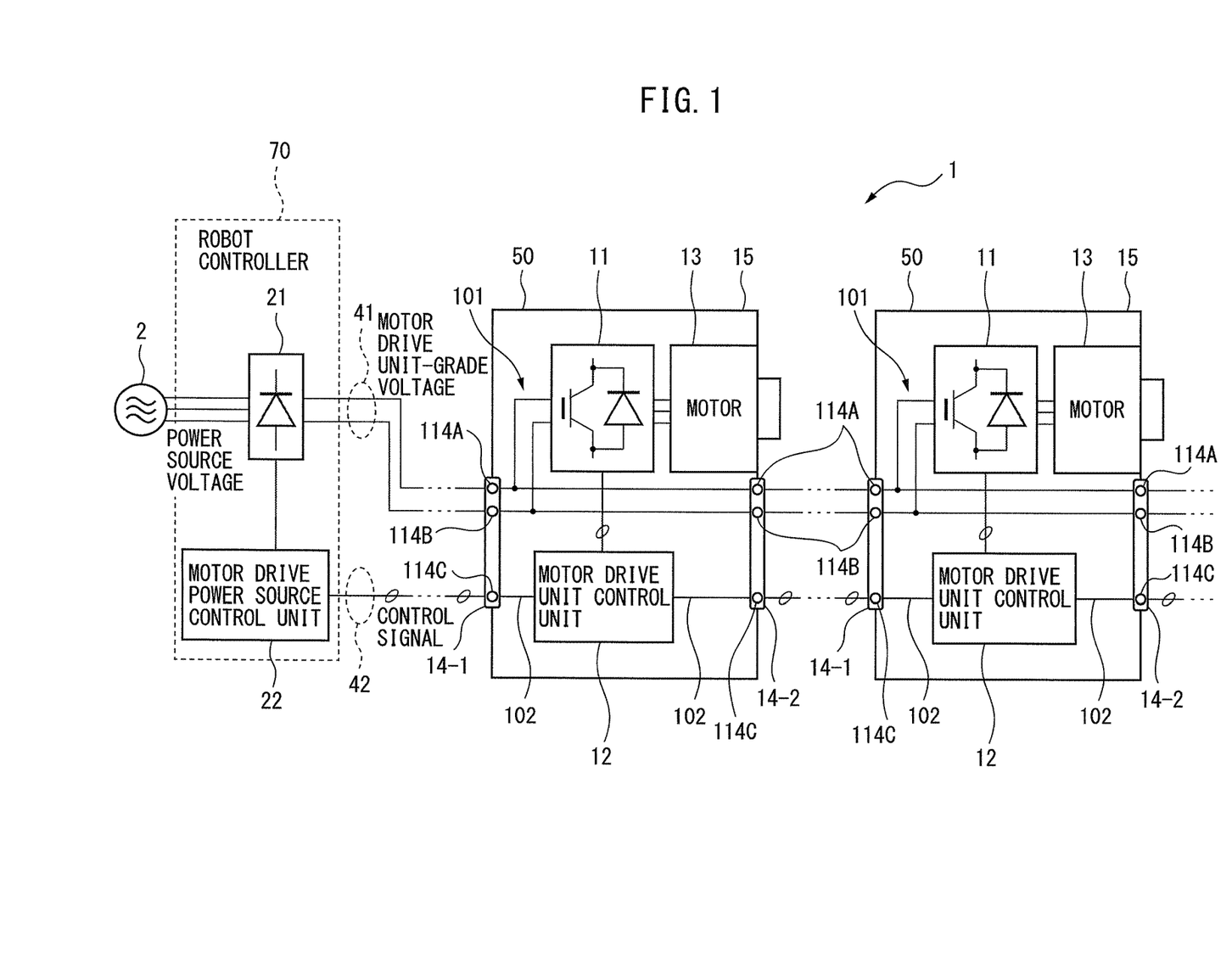
FIG. 1 is a (first) diagram illustrating a robot according to one embodiment.
Figure 2:
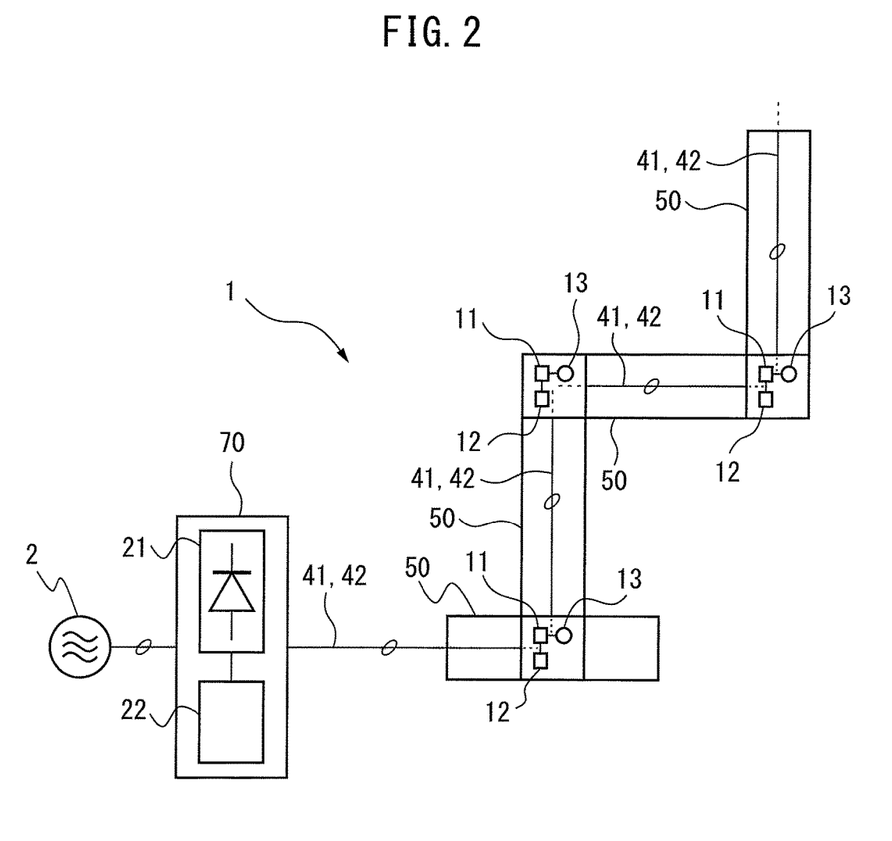
FIG. 2 is a (second) diagram illustrating a robot according to one embodiment.

FIGS. 1 and 2 are diagrams illustrating a robot according to one embodiment.

A robot 1 according to the one embodiment includes a motor drive power source 21, a motor drive unit control unit 12, an alternating current motor (hereinafter simply referred to as the "motor") 13, a robot arm 50, and a robot controller 70.

The motor drive unit 11 converts a motor drive unit-grade voltage, which is a direct current voltage output from the motor drive power source 21 to be described below, to a motor drive voltage, which is a three-phase alternating current voltage, and outputs the motor drive voltage. More specifically, the motor drive unit 11 is configured of an inverter formed of a full-bridge circuit with a semiconductor switching element, and the switching element is driven to be turned on and off in response to a switching command received from the motor drive unit control unit 12 so that the input motor drive unit-grade voltage (direct current voltage) is converted to a motor drive voltage (three-phase alternating current voltage) and drive power is supplied to the motor 13. Although the type and configuration of the motor drive unit 11 do not particularly limit the present aspect, as one example, there is a PWM inverter formed of a switching element and a bridge circuit with diodes connected antiparallel to the switching element. Examples of the switching element include an IGBT, a thyristor, GTO (gate turn-off thyristor), and a transistor, but the type of the semiconductor switching element itself does not limit the present aspect and other semiconductor switching elements may be used.

The motor drive unit control unit 12 controls the conversion operation of the motor drive unit 11. More specifically, the motor drive unit control unit 12 generates a switching command for controlling the power conversion operation of the motor drive unit 11 so that the motor 13 performs desired rotation operation. For example, when the motor drive unit 11 is a PWM inverter, the motor drive unit control unit 12 compares a motor drive command received from a high-order control unit (not illustrated) with a triangular wave carrier signal having a predetermined carrier frequency, generates a PWM control signal for controlling the switching operation of the switching element in the PWM inverter, which is the motor drive unit 11, and outputs the PWM control signal to each switching element in the motor drive unit 11.

The motor 13 is driven to be rotated on the basis of an alternating current drive current that flows when a motor drive voltage, which is a three-phase alternating current voltage output by the motor drive unit 11, is applied to a motor input terminal (not illustrated).

When the motor drive unit 11, the motor drive unit control unit 12, and the motor 13 are accommodated in a casing 15 of a single robot arm 50, a motor drive unit-integrated motor can be constructed. In this case, it is preferable that the motor drive unit 11 and the motor 13 are arranged in vicinity. In this way, an alternating current power source cable between the motor drive unit 11 and the motor 13 can be shortened to allow a reduction in cost and size of the motor drive unit-integrated motor. In the case of an articulated robot, robot arms 50 are coupled, and the motor drive units 11 and the motor drive unit control units 12 in the respective robot arms 50 are daisy-chained by a connection unit 14 to be described below.

The motor drive power source 21 converts a power source voltage, which is a three-phase alternating current voltage input from the alternating current power source 2 side, to a motor drive unit-grade voltage, which is a direct current voltage, and outputs the motor drive unit-grade voltage. The motor drive unit-grade voltage output from the motor drive power source 21 is input (applied) to the motor drive unit 11. Although the type and configuration of the motor drive power source 21 do not particularly limit the present aspect, as one example, there is a PWM converter formed of a switching element and a bridge circuit with diodes connected antiparallel to the switching element. Examples of the switching element include an IGBT, a thyristor, GTO (gate turn-off thyristor), and a transistor, but the type of the switching element itself does not limit the present aspect and other semiconductor elements may be used.

The conversion operation of the motor drive power source 21 is controlled by a motor drive power source control unit 22 in the robot controller 70. More specifically, the motor drive power source control unit 22 generates a switching command for controlling the power conversion operation of the motor drive unit 11 so that the motor 13 performs desired rotation operation. For example, when the motor drive power source 21 is a PWM converter, the motor drive power source control unit 22 compares a motor drive command received from a high-order control unit (not illustrated) with a triangular wave carrier signal having a predetermined carrier frequency, generates a PWM control signal for controlling the switching operation of the switching element in the PWM converter, which is the motor drive power source 21, and outputs the PWM control signal to each switching element in the motor drive power source 21.

The robot controller 70 comprehensively controls the operation of the robot 1 and is provided independently of the robot arm 50. The motor drive power source 21 and the motor drive power source control unit 22 are arranged in the robot controller 70.

As described above, according to the present embodiment, the motor drive unit 11, the motor drive unit control unit 12 and the motor 13 are arranged on the robot arm 50, and the motor drive power source 21 and the motor drive power source control unit 22 are arranged in the robot controller 70.

In the robot 1, robot arms 50 can be connected to one another with the connection unit 14.

Each robot arm 50 includes the connection unit 14 for daisy-chaining a motor drive unit-grade voltage (direct current voltage) input side of the motor drive unit 11 arranged on the robot arm 50 to a motor drive unit-grade voltage (direct current voltage) input side of the motor drive unit 11 arranged on a robot arm that is different from the aforementioned robot arm 50. The motor drive unit-grade voltage output from the motor drive power source 21 is input to the motor drive units 11 arranged on the respective robot arms 50 via the connection unit 14. The connection unit 14 is described in more detail below.

The connection unit 14 includes two connectors 14-1 and 14-2, and a local power line cable 101.

Each of the connectors 14-1 and 14-2 includes power terminals 114A and 114B for connection to an external power line cable 41. The two power terminals are provided because the direct current voltage power line cable 41 is formed of two lines (i.e., a wire for positive potential and a wire for grounding).

The local power line cable 101 is formed of star-connected cables in which one end of each cable is electrically connected to any of the connectors 14-1 and 14-2 and the motor drive unit-grade voltage input side of the motor drive unit 11. Specifically, the local power line cable 101 is formed by three cables being star-connected. As illustrated in FIG. 1, two pairs of star-connected cables are provided, i.e., cables for positive potential and grounding according to the power line cable 41. Among the three cables which are star-connected, one is connected to the direct current input side of the motor drive unit 11 and the remaining two are connected to the power terminals 114A and 114B of the respective connectors 14-1 and 14-2, respectively. When the local power line cable 101 is arranged in such a manner between the motor drive unit 11 and the power terminals 114A and 114B, the motor drive units 11 are brought into a parallel-connected state as the robot arms 50 are daisy-chained.

In addition, the connection unit 14 may include a signal terminal 114C and a local signal line cable 102 for a signal supply system in addition to the terminals and the cable for the aforementioned power supply system.

Specifically, the connectors 14-1 and 14-2 in the connection unit 14 may further include the signal terminal 114C for connection to an external signal line cable 42. In an example illustrated in FIG. 1, each of the connectors 14-1 and 14-2 is provided with one signal terminal 114C for serial communication. For parallel communication, the connectors 14-1 and 14-2 include the number of pins corresponding to the type of a control signal which is parallel-communicated.

In FIG. 1, for the sake of simplicity of the drawing, the illustration where "a tilted oval is placed on one line" indicates that the signal line cable 42 is formed of a multiple number of wires.

Two pairs of local signal line cables 102 are provided in the robot arm 50. Regarding each pair of the two pairs of local signal line cables 102, one side is connected to the motor drive unit control unit 12 and the other side is connected to the signal terminal 114C of the respective connectors 14-1 and 14-2. Each local signal line cable 102 is configured of one wire for serial communication or is configured of the number of wires corresponding to the wiring number of the signal line cables 42 for parallel communication. In FIG. 1 and subsequent drawings, for the sake of simplicity of the drawings, the illustration where "a titled oval is placed on one line" indicates that each local signal line cable 102 is formed of the multiple number of wires as in the case of the signal line cable 42.

As described above, the connection unit 14 according to the present embodiment is used to daisy-chain the motor drive unit-grade voltage input side of the motor drive unit 11 arranged on the robot arm 50 to the motor drive unit-grade voltage input side of the motor drive unit 11 arranged on a robot arm 50 different from the aforementioned robot arm 50 via the power line cable 41, and to connect the motor drive unit control unit 12 arranged on the robot arm 50 to the motor drive unit control unit 12 arranged on the robot arm 50 different from the aforementioned robot arm 50 via the signal line cable 42 for serial communication. The presence of the connection unit 14 enables daisy-chaining of the robot arms 50. Specifically, between adjacently daisy-chained robot arms 50, the power line cable 41 for supplying a motor drive unit-grade voltage, which is a direct current voltage, and the signal line cable 42 for connecting the motor drive unit control units 12 provided on each of the adjacently daisy-chained robot arms 50 are collectively electrically connected by the connection unit 14 provided on the respective robot arms 50. By the daisy chaining of the robot arms 50 via the connection unit 14, the motor drive units 11 provided in the respective robot arms 50 are brought into a parallel-connected state with respect to one another, and the motor drive unit control units 12 provided in the respective robot arms 50 are brought into a serial-connected state.

When the motor drive power source 21 and the corresponding motor drive power source control unit 22 are connected to one of the robot arms 50 positioned at both ends among the robot arms 50 which are daisy-chained via the connection unit 14, a system for driving the motors 13 in the robot arms 50 can be constructed. Regarding the power supply system, a relationship is obtained in which the motor drive units 11 connected in parallel to one another via the connection unit 14 are connected to the motor drive power source 21. Specifically, a DC link is constructed of the power line cable 41, the connectors 14-1 and 14-2 in the connection unit 14, and the local power line cable 101, and the same direct current voltage (DC link voltage) output from the motor drive power source 21 is applied to the motor drive units 11 which are connected in parallel to one another. In addition, regarding the signal supply system, a relationship is obtained in which the motor drive power source control unit 22 and the respective motor drive unit control units 12 are serial-connected via the connection unit 14, and communication between the motor drive power source control unit 22 and the motor drive unit control units 12 is enabled. When an additional robot arm 50 is provided, it is sufficient that the additional robot arm 50 is only daisy-chained to the endmost robot arm 50, and in addition, because replacement or removal of one or some of the already constructed robot arms 50 is easy, extension or change of the equipment is easy.

Next, a mechanism unit of the robot arm 50 is described.

The robot 1 according to the one embodiment is an articulated robot including robot arms 50 that use the rotary drive force of the motors 13 as a power source for the operation, and the local power line cable 101 and the local signal line cable 102 for connecting the adjacently connected two robot arms 50 are disposed in the robot arms 50. Each robot arm 50 includes the motor drive power source 21, the motor drive power source control unit 22, and the motor 13. The rotary drive force of the motors 13 is used as the power source for the relative movement of the adjacently connected robot arms 50. In FIG. 2, for the sake of simplicity of the drawings, the illustration of the connection unit 14 and its internal configurational elements is omitted, and the illustration where "a tilted oval is placed on one line" indicates power line cables 41 and signal line cables 42. Because the robot arms 50 are arranged in a daisy-chained manner in the case of an articulated robot, when the robot arms 50 are daisy-chained with the aforementioned connection unit 14, the number of wires can be reduced and the total wiring length can be reduced. As a result, twisting or interference of the cables is reduced, making the wiring easy.

Figure 3:
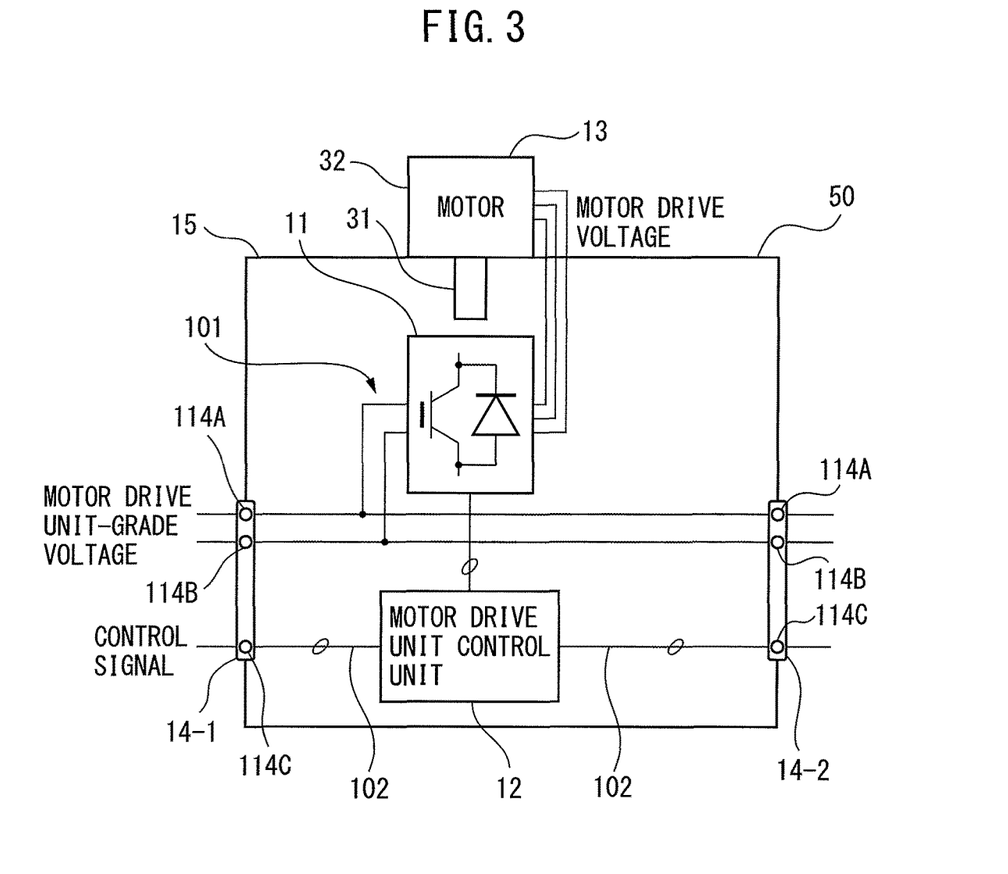
FIG. 3 is a diagram illustrating another robot arm according to one embodiment.

FIG. 3 is a diagram illustrating a robot arm according to another embodiment. In the present embodiment, regarding the robot arm 50, the motor drive unit 11, the motor drive unit control unit 12, and a rotary shaft 31 of the motor 13 are fixedly mounted on the casing 15. Specifically, in the present embodiment, a motor casing 32 of the motor 13 is not present in the casing 15. However, it is preferable that the motor drive unit 11 and the motor 13 are arranged as close as possible in order to shorten the wiring length between the motor drive unit 11 and the motor 13. The rotary shaft 31 of the motor 13 is fixedly mounted on the casing 15, and the motor casing 32 of the motor 13 is fixedly mounted on the casing of another robot arm 50 which is mounted adjacently, so that the rotary drive of the motor 13 can be used as the power source for relative movement between the robot arms 50 adjacently connected to one another, thereby enabling construction of an articulated robot in which the robot arms 50 themselves move.

Figure 4:
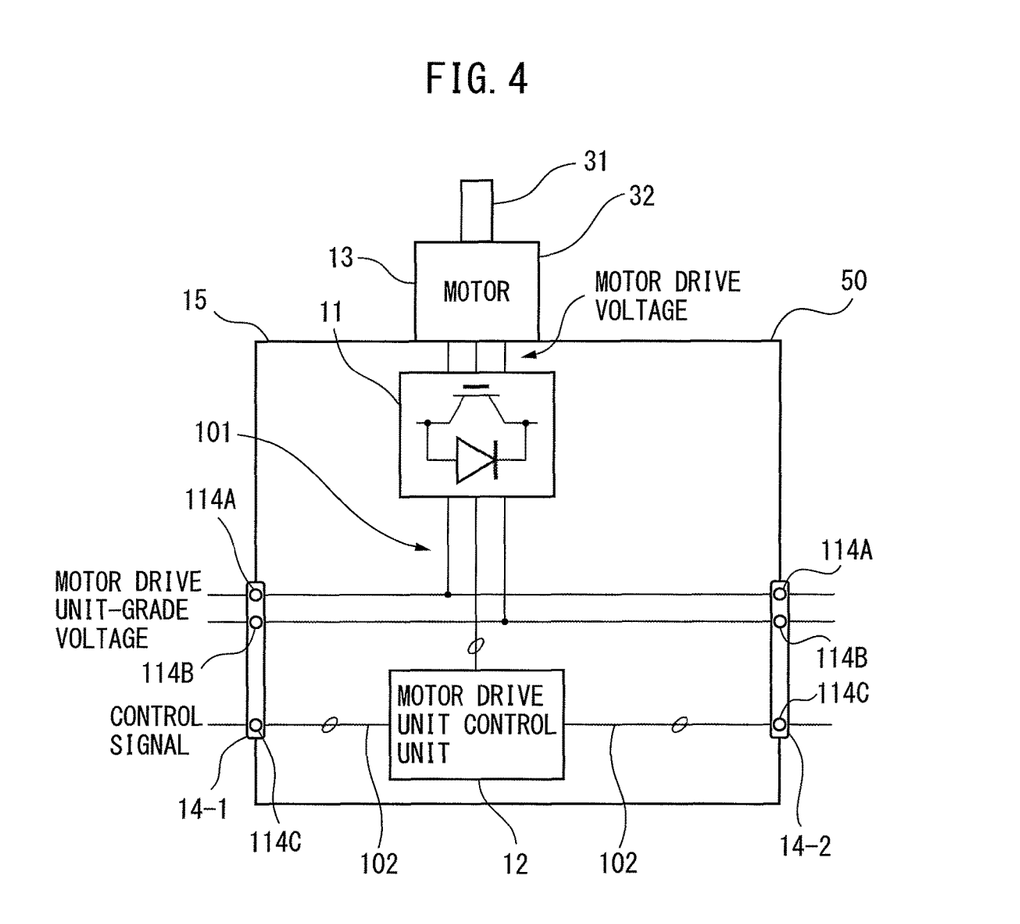
FIG. 4 is a diagram illustrating yet another robot arm according to one embodiment.

FIG. 4 is a diagram illustrating a robot arm according to yet another embodiment. In the present embodiment, regarding the robot arm 50, the motor drive unit control unit 12 and the motor casing 32 of the motor 13 are fixedly mounted on the casing 15. Specifically, in the present embodiment, the motor casing 32 of the motor 13 is fixedly mounted on the casing 15, and the rotary shaft 31 of the motor 13 is exposed out of the robot arm 50. However, it is preferable that the motor drive unit 11 and the motor 13 are arranged as close as possible in order to shorten the wiring length between the motor drive unit 11 and the motor 13. According to the present embodiment, for example, regarding the endmost robot arm 50 of the robot arms 50 of the articulated robot, a tool can be used by being joined to the rotary shaft 31 of the motor 13 where the motor casing 32 is fixedly mounted on the casing 15.

Figure 5:
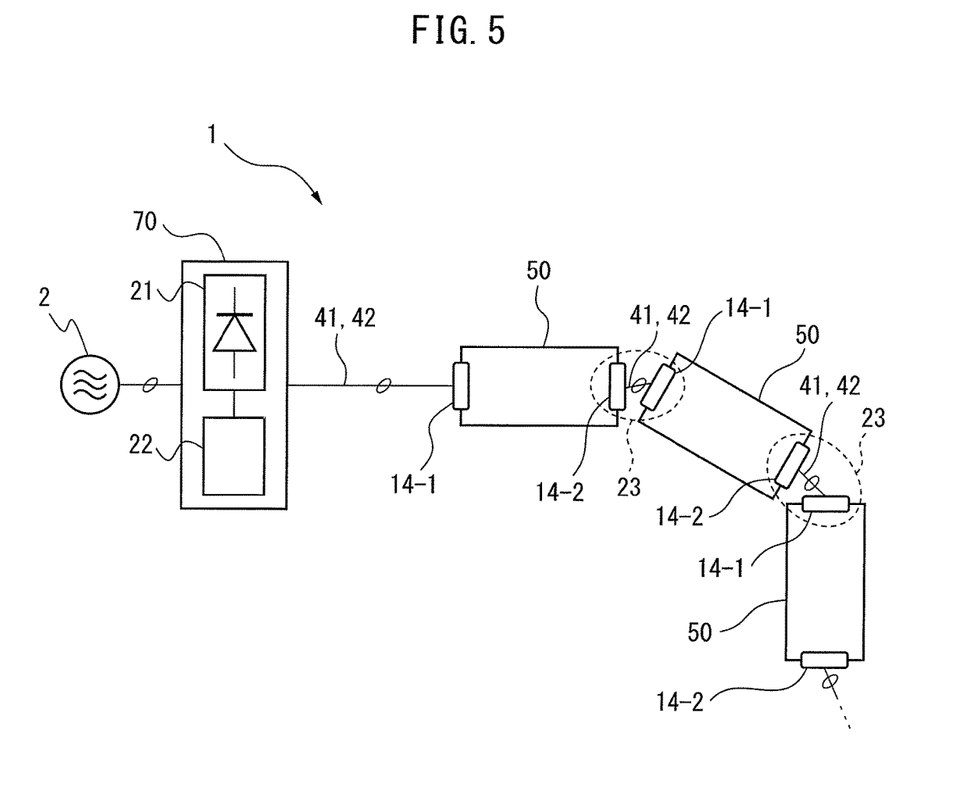
FIG. 5 is a diagram illustrating an articulated robot including the robot arm illustrated in FIGS. 3 and 4.

FIG. 5 is a diagram illustrating an articulated robot including the robot arm illustrating in FIG. 3. An articulated robot 1 includes the robot arm 50 illustrated in FIG. 3, the motor drive power source 21, the motor drive power source control unit 22, and a connection mechanism 23 for connecting the robot arm 50 to a robot arm different from the robot arm.

The adjacent robot arms 50 are electrically connected such that the connection units 14 in the respective robot arms 50 are connected to the power line cable 41 and the signal line cable 42, and are mechanically connected with the connection mechanism 23. When an additional robot arm 50 is provided, it is sufficient that the additional robot arm 50 is only daisy-chained to the endmost robot arm 50, and in addition, because replacement or removal of one or some of the already constructed robot arms 50 is easy, extension or change of the equipment is easy. For example, it is easy to take actions such as a change of the length of the robot arm 50 and replacement with a robot arm 50 including the motor having a large output.

Figure 6:
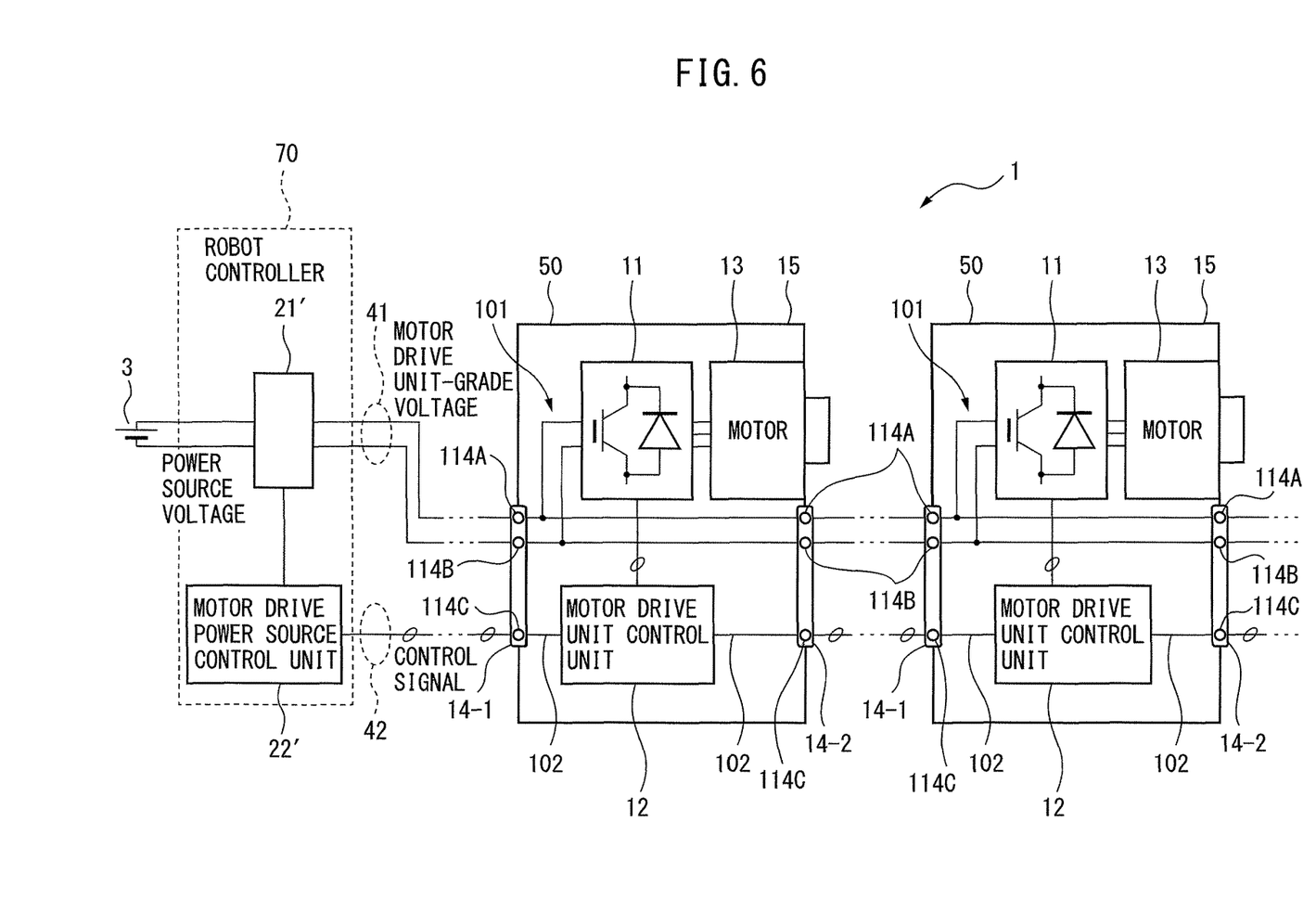
FIG. 6 is a diagram illustrating another example of a motor drive power source according to one embodiment.

In the aforementioned embodiment, the power source voltage is a three-phase alternating current voltage from the alternating current power source 2 side. Instead of this, a direct current voltage from the direct current power source, e.g., a battery, may be the power source voltage. FIG. 6 is a diagram illustrating another example of the motor drive power source according to the one embodiment. A motor drive power source 21' is configured as a DCDC converter that converts the power source voltage, which is a direct current voltage from the direct current power source 3, e.g., a battery, to the motor drive unit-grade voltage, which is a direct current voltage, and outputs the motor drive unit-grade voltage. The motor drive unit-grade voltage output from the motor drive power source 21 is input (applied) to the motor drive unit 11. The conversion operation of the motor drive power source (DCDC converter) 21' is controlled by a motor drive power source control unit 22', which is present in the robot controller 70. Because the circuit configurational elements other than the above are the same as the circuit configurational elements illustrated in FIGS. 1 to 5, the same circuit configurational elements are designated with the same reference numerals and the detailed description of the circuit configurational elements is omitted.

According to one aspect of the present disclosure, a low-cost robot in which the wiring number of power line cables is small and rearrangement work of a robot arm is easy can be realized.

Specifically, according to one aspect of the present disclosure, because the motor drive unit (inverter), the motor drive unit control unit, and the motor are provided on a single robot arm, and the connection unit for daisy chaining to an adjacent robot arm is provided in each robot arm, the wiring number of power line cables for supplying the direct current voltage from the motor drive power source to the motor drive unit can be reduced. As a result, because the chance of twisting or interference of the wiring is reduced, the wiring design or replacement of a robot arm is easy, thereby enabling realization of a robot having flexibility in connection of a robot arm. When an additional robot arm is provided, it is sufficient that the additional robot arm is only daisy-chained to the endmost robot arm, and in addition, because replacement or removal of one or some of the already constructed robot arms is easy, extension or change of the equipment is easy. Generally, because robot arms are often coupled on a single line in the case of an articulated robot, the present aspect is particularly useful.

In addition, according to one aspect of the present disclosure, the motor drive power source (converter) and the motor drive power source control unit are not provided on a robot arm, but are provided on a robot controller which is different from the robot arm, so that the weight of the robot arm can be reduced. In addition, it is sufficient that the number of motor drive power sources for supplying the direct current voltage to the motor drive units in the respective robot arms is one, thereby enabling a reduction in cost of the robot.

What is claimed is:

1. A robot comprising:
a motor drive power source for converting a voltage supplied from a power source to a motor drive unit-grade voltage, the motor drive power source outputting the motor drive unit-grade voltage;
a robot arm having a plurality of robot arm segments, each robot arm segment including:
a motor drive unit for converting the motor drive unit-grade voltage output from the motor drive power source to a motor drive voltage,
a motor drive unit control unit for controlling the motor drive unit to output the motor drive voltage,
a motor driven to be rotated by the motor drive voltage output by the motor drive unit, and
a connection unit creating a direct and continuous connection between the unit-grade voltage output from the motor drive power source to the motor drive unit and another connection unit of another robot arm segment of the robot arm, the direct and continuous connection electrically connecting each of the robot arm segments in parallel with the unit-grade voltage output from the motor drive power source.

2. The robot according to claim 1, wherein
each connection unit is configured for daisy-chaining an input side of the motor drive unit arranged on the robot arm segment, the input side being for the motor drive unit-grade voltage, to an input side of the motor drive unit arranged on a robot arm segment different from the robot arm segment, the input side being for the motor drive unit-grade voltage, and
the motor drive unit-grade voltage output from the motor drive power source is input to the motor drive units arranged on the respective robot arm segments via each connection unit.

3. The robot according to claim 1, further comprising:
a casing for housing therein the motor drive unit and the motor driven to be rotated by the motor drive unit.

4. The robot according to claim 1, wherein a motor drive unit control unit for controlling conversion operation of the motor drive unit is arranged on the robot arm segment on which the motor drive unit is arranged.

5. The robot according to claim 4, wherein
each connection unit includes two connectors each including a combination of a power terminal for electrical connection to a power line cable for supplying the motor drive unit-grade voltage and a signal terminal for connection to an external signal line cable,
a star-connected local power line cable each one end thereof is electrically connected to any of the two connectors and the input side of the motor drive unit, the input side being for the motor drive unit-grade voltage, and
two local signal line cables one side of each of the local signal line cables is connected to the motor drive unit control unit and the other side of each of the local signal line cables is connected to the signal terminal of one of the respective connectors.

6. The robot according to claim 1, wherein
each connection unit includes;
two connectors each including a power terminal for electrical connection to a power line cable for supplying the motor drive unit-grade voltage, and
a star-connected local power line cable each one end thereof is electrically connected to any of the two connectors and the input side of the motor drive unit, the input side being for the motor drive unit-grade voltage.

* * * * *